United States Patent [19]

Latymer

[11] 4,292,336
[45] Sep. 29, 1981

[54] SWEETENING COMPOSITIONS CONTAINING PEPTIDE SWEETENERS AND A METHOD FOR THEIR MANUFACTURE

[75] Inventor: Zdenek Latymer, Reading, England

[73] Assignee: Talres Development (N.A.) N.V., Netherlands Antilles

[21] Appl. No.: 117,445

[22] Filed: Feb. 1, 1980

[30] Foreign Application Priority Data

Feb. 6, 1979 [GB] United Kingdom ............... 4165/79

[51] Int. Cl.$^3$ ............................................. A23L 1/236
[52] U.S. Cl. ..................................... 426/548; 426/656; 426/657; 426/804
[58] Field of Search ............... 426/548, 576, 657, 804, 426/465, 471, 384, 656

[56] References Cited

U.S. PATENT DOCUMENTS

| | | | |
|---|---|---|---|
| 3,868,465 | 2/1975 | Furda et al. ................. | 426/804 X |
| 4,004,039 | 1/1977 | Shoaf et al. ................. | 426/548 |
| 4,031,258 | 6/1977 | Haas et al. .................. | 426/548 |
| 4,031,259 | 6/1977 | Lugay et al. ................ | 426/548 |
| 4,059,706 | 11/1977 | Pischke et al. ............. | 426/548 |
| 4,096,285 | 6/1978 | Burge et al. ................ | 426/548 |
| 4,122,205 | 10/1978 | Burge et al. ................ | 426/656 X |

OTHER PUBLICATIONS

Searle Biochemics Technical Bulletin, "Equa 200 (Aspartame) Sweetener as a Food Ingredient", Sep. 27, 1974.

*Primary Examiner*—Esther M. Kepplinger
*Attorney, Agent, or Firm*—Ostrolenk, Faber, Gerb & Soffen

[57] ABSTRACT

A heat-stable sweetening composition containing a peptide sweetener such as thaumatin is obtained by mixing the sweetener with gelatin at a weight ratio of gelatin to sweetener of less than 100:1. Solid forms can be prepared by drying a co-solution of the sweetener and gelatin in water, preferably containing an edible acid.

16 Claims, No Drawings

SWEETENING COMPOSITIONS CONTAINING PEPTIDE SWEETENERS AND A METHOD FOR THEIR MANUFACTURE

The present invention relates to sweetening compositions containing peptide sweeteners.

Peptide sweeteners are materials which impart a sweet taste to compositions and comprise a peptide chain of at least two amino acids. Where the chain is a polypeptide, then the material may also be termed a protein sweetener.

An example of a peptide sweetener which is a protein is the sweet principle known as thaumatin which occurs in the fruit of the tropical plant *Thaumatococcus daniellii* Benth. of the family Marantaceae. This plant grows in various parts of tropical Africa and is called Katemfe in Sierra Leone. The fruit is tetrahedral, approximately 4 cm in diameter and contains up to three large black seeds each having a white or light yellow aril at its apex surrounded by a transparent jelly. The arils are intensely sweet. Thaumatin can be extracted by the procedures described by van der Wel and Loeve, Eur J. Biochem 31 221-5, (1972), optionally with the modification that an aluminium salt solution is used as extractant, as is described in our British Pat. No. 1,501,409, or preferably with the modification that powdered dry aril is extracted with acid as described in our British patent application No. 2,015,533A.

Another example of a protein sweetener is the sweet principle known as monellin which is found in the fruit of the tropical plant *Dioscoreo-phyllum cumminsii* Diels., of the family Menispermaceae. The plant and berries have become known as "Guinea Potato" or "Serendipity Berry." The plant is native to the forests of tropical West Africa and bears grape-like clusters of red berries about 10 mm in diameter. The berries have a tough outer skin enclosing a white sweet-tasting mucilaginous material surrounding the seed. The sweet principle can be extracted from the mucilaginous material using the procedure described, for example, in the papers of J. A. Morris et al. J. Biol. Chem. 248 (2), 543-9 (1973) or van der Wel, F.E.B.S. Letters 21 (1), 88-90 (1973), and is the subject of our British Pat. No. 1,337,086.

It is not necessary for a peptide chain to be a polypeptide, i.e. protein, in order for it to be a peptide sweetener. The compound known as aspartame is an example of a dipeptide which possesses strong sweetening powers. Dipeptide sweeteners are described in U.S. Pat. Nos. 3,495,403 and 3,492,131 among others. A dipeptide sweetener is typically capable of replacing 100 to 200 times its weight of sucrose. Most suitable of these compounds are the lower alkyl esters of aspartylphenylalanine, such as the methyl ester which is aspartame.

A disadvantage common to the peptide sweeteners is the loss of sweetening power with increase in temperature.

Thus, for instance, thaumatin and monellin are heat sensitive and undergo irreversible heat denaturation with accompanying loss of sweetness. The loss in sweetness of these compounds is mentioned, for instance, in our British Pat. Nos. 1,525,131, 1,523,931 and 1,523,932, and has limited their use in hot food and beverages, especially tea and coffee, and in products which require a heat processing step during manufacture, as is the case with chewing gum and also with drinks which need pasteurization. It is found, for example, that thaumatin loses 30% of its sweetness when maintained for 15 minutes at 60° C., 52% of its sweetness in 5 minutes at 75° C., 75% of its sweetness in 5 minutes at 80° C. and 100% of its sweetness in 1 minute at 92° C.

Problems have arisen also with aspartame and other dipeptide sweeteners when applied to food use, in that these compounds tend to decompose and thus lose their sweetness upon heating at temperatures above about 80° C. As with other peptide sweeteners, the lack of heat stability in dipeptide sweeteners has limited to a certain extent their utilization in hot food, hot beverages including tea and coffee, and in compositions which are subjected to heat during manufacture As an example, when boiling water (97° C.-98° C.) was poured onto dried powdery aspartylphenylalanine methyl ester in a plastics beaker and cooled to a drinking temperature, assessors concluded that there was a 25% to 30% loss of sweetness.

British Pat. No. 1,411,664 discusses this disadvantage of the dipeptide sweeteners, and states that a solution is to co-dry the sweetener at above 100° C. with a bulking agent. It is then an inherent disadvantage that the resultant products will always contain a bulking agent, which by its very nature will be the dominant component.

The present invention seeks to limit the disadvantages of peptide sweeteners and broaden their application in sweetening compositions.

It has been discovered that gelatin can promote heat stability in sweetening compositions containing peptide sweeteners. The exact interaction between the gelatin and the peptide is a matter for conjecture, but nevertheless a real improvement can be demonstrated.

In accordance with the present invention, we provide a sweetening composition which comprises gelatin intimately mixed with a peptide sweetener, the ratio by weight of gelatin to peptide sweetener being less than 100:1.

Particularly preferred forms for the compositions are low calorie sweeteners for hot food or beverages, including tea and coffee. The compositions can be formulated as powders, unit dosage forms such as tablets, granules, or dragees, or can be formulated as semi-solids or liquids, e.g. in dropper packs.

Paricularly for the protein sweeteners, it is surprising that the present compositions should retain sweetening power. Thaumatin and monellin lose sweetness when formulated with most gelling agents, notably polysaccharides. It is thus surprising that gelatin does not deleteriously affect their sweetness, and it is an especially unexpected finding that gelatin can promote their heat stability.

Gelatin is a product obtained by the partial hydrolysis of collagen derived usually from the skin, white connective tissue and bones of animals. It is a derived protein of variable composition, and is obtained in Type A or Type B forms. Type A gelatin is typically prepared by swelling raw materials (usually pork skins) in a dilute acid solution for 10-30 hours and thereafter cooking the swollen material to effect conversion of collagen to gelatin. Type B gelatin is typically prepared by swelling the raw materials (usually ossein or hide stock) in a saturated lime solution of 3-12 weeks, followed by the conversion. This and other aspects of gelatin are discussed further in Kirk-Othmer, 10 499-599, 1966 (Second Edition).

For the compositions of the present invention, Type A gelatin or Type B gelatin may be utilized; however it is preferred to use Type A gelatin and it is also preferred to use a gelatin having a Bloom strength of greater than 200.

Lower Bloom strength material can be used, but the heat stabilising effect is less than that obtained at higher Bloom numbers. An advantage of the lower Bloom strength material is its better solubility in cold water and the ease with which it dries to a powder.

The compositions according to the present invention, may be prepared by any convenient process which intimately combines the gelatin with the peptide sweetener. In general, drying a co-solution of sweetener and gelatin in water is an effective method.

An important factor for the preparation of heat-stable compositions is the correct pH of the solution formed. It is known, for example, that the sweetness of thaumatin is pH-dependent and that thaumatin exhibits optimum sweetness over the pH range of 2 to 10. For the best results with peptide sweeteners in general, we find the pH of the solution to be dried should be adjusted to be from 2.5 to 2.9, preferably pH 2.7. The pH can be adjusted by any food-grade acid, but the best results are obtained when using one or more of citric, malic, fumaric and mucic (galactaric) acids.

In a preferred process for preparing the present compositions, gelatin is dissolved in potable water containing the appropriate amount of edible acid to give the required pH. Any potable water may be used for preparation of the present sweetening compositions, but the best results are obtained using distilled water, preferably degassed. Dissolution may be effected by slow-speed even mixing and simultaneous moderate heating, e.g. to about 42° C. When the gelatin has completely dissolved, the peptide sweetener is added. The solution may first be cooled down to below 40° C., preferably to about 32° C., before the peptide sweetener, e.g. thaumatin, monellin or aspartame, is added. Dissolution of the peptide sweetener can be aided by slow, even mixing: vigorous mixing is not desirable because of aeration and frothing.

The relative amounts of gelatin and peptide sweetener will depend on the desired properties of the composition. As assessed by a taste panel, we find that a particularly suitable proportion of gelatin to sweetener is at least 3 parts of gelatin to 2 parts of sweetener by weight. The amount of gelatin can be increased without any loss of sweetness or other adverse effect on the properties up to a gelatin to sweetener ratio of 100:1, although economic reasons make large amounts of gelatin undesirable and we thus prefer a ratio of less than 20:1, more preferably less than 5:1.

On the other hand, a decrease in the amount of gelatin, much below the ratio of 3:2, appears to lead to adverse effects on the heat stability of the sweetener, and accordingly a preferred minimum ratio of gelatin to sweetener is 1:1.

In general, we find that the greater the amount of gelatin, the lower the reduction in sweetness intensity when the composition is heated. The stabilizing effect obtained will also depend on the final concentration of the sweetening composition in the product, as well as other factors such as pH. The correlation between stability and temperature, pH, concentration, etc., is complex and not yet fully understood.

A sweetening solution of gelatin and peptide sweetener can be used as such as a sweetening composition or the solution can be dried by any convenient method. One preferred method for drying is to expose a thin layer to the air. The temperature during drying should preferably be kept as low as possible and should ideally not exceed 45° C. This precaution is normal in handling a peptide sweetener such as thaumatin, although here it is less necessary since the gelatin does, of course, stabilise the sweetener against heat degradation. In fact, spray drying is possible if the high temperature residence time is kept very short. Alternatively, freeze drying is acceptable.

Thaumatin and/or monellin produce fullness and richness in the sweetening compositions and other desirable properties. In themselves, the compositions with protein sweeteners possess satisfactory "body" and "mouthfeel." Other characteristics can be modified using taste modifiers. Examples of suitable modifiers are given in our British Pat. Nos. 1,525,131, and 1,523,932. Of these modifiers, we prefer those mentioned in British Pat. No. 1,523,932.

Dipeptide sweeteners can be used as the only peptide sweetener or in combination with other such sweeteners e.g. thaumatin and/or monellin. It has been found that the rate of solution of dipeptide sweetener such as a lower alkyl ester of aspartylphenylalanine when in a composition of the invention is significantly increased and when mixed with water, it dissolves readily without forming any lumps.

The typical solid sweetening compositions of the invention are easily dissolved in water and have been found to be preferable to saccharin in their sweetening character, and not to impair the flavour of the foodstuff, beverage or other sweetened material. Saccharin may, however, be added to the compositions containing protein sweeteners in order to present a sweetness profile with a more rapid onset. Alternatively, aspartame (another peptide sweetener) may be added.

The following examples are given to illustrate the present invention. In these examples, a taste panel was used to estimate sweetness, as is conventional. The panel assessed which of a series of standardised sucrose solutions had the same sweetness intensity as the sample (i.e. which solution was as sweet as the sample). The ratio of the concentration of the isosweet sucrose solution to the concentration of the sample solution, which may alternatively be expressed as the dilution of the sample solution relative to the sucrose solution, then gives the number of times the material under test is sweeter than the sugar at the concentration of the sample in the sample solution. From such figures, the percentage sweetness retained after exposure to heat can be calculated.

The panel found, for example, that the sweetness of 0.002% (w/v) thaumatin solution at room temperature was equal in sweetness to 6.2% sucrose. The thaumatin was therefore 3100 times sweeter than sucrose on a weight basis and $2.0 \times 10^5$ times sweeter on a molar basis (the molecular weight of sucrose is 342 and that of thaumatin is about 22,000). In tea or coffee, the relative sweetness of thaumatin is appreciably less: this reduction is a known phenomenon and seems to be due to interaction with caffeine and/or tannin present in the drink. Knowing the end-use of the composition, there is little difficulty in formulating a composition which in practice has the desired sweetening power.

EXAMPLE 1

Thaumatin-gelatin low calorie sweetening composition.

0.028 g citric acid (Fisons) was added to 12 ml distilled water to give a pH of 2.7. 0.120 g gelatin (prepared by Sigma Chemical Company from swine skin, approximately 300 Bloom) was then dispersed in the acid solution using even and slow mixing while at the same time heating the solution to 42° C. The gelatin dissolved once the temperature reached 42° C.

The solution was thereafter cooled down to 32° C. and 0.080 g of thaumatin added. Slow mixing gave a homogenous clear solution which was dried as a thin layer exposed to air of temperature 45° C. Freeze drying can be used as an alternative drying method.

The resultant dried powder obtained after grinding weighed 0.2 g and was approximately equal in sweetness to 200 g of sucrose. The powder did not appreciably lose sweetness when dissolved in hot water (about 90° C.), as shown by the following test:

Drinking water at 97°-98° C. (100 ml aliquots) was poured onto 5 mg samples of the above-described composition (containing 2 mg thaumatin) in plastics beakers. The resulting solutions were allowed to cool to 62° C. and assessed for sweetness in comparison with standardized sucrose solutions. If no sweetness had been lost, the solutions should have been equal in sweetness to a 6.2% sucrose solution. The assessed sweetness was, in fact, equal to that of a 5% sucrose solution, giving a sweetness reduction of 19.4%. Control samples of 2 mg thaumatin had no sweetness detectable. In a similar experiment, water at 92° C. gave a sweetness equivalent to 6.2% sucrose, i.e. no loss, while controls lost nearly all their sweetness.

A similar test was carried out using aspartame. The loss was negligible at temperatures from 80° to 98°, while controls lost 25%-30% at 97°-98° C.

EXAMPLE 2

A free flowing powder of a low calorie sweetening composition 0.025 kg of a heat stable thaumatin-gelatin sweetening composition was prepared in accordance with the procedure of Example 1, and 0.100 kg powdered sodium saccharin and 1.000 kg powdered glucuronic acid were then added.

The resultant free flowing powder, weight 1.125 kg, possessed a taste profile comparable to sucrose.

EXAMPLE 3

Sweetening compositions for tea and coffee

Tablets were prepared in a conventional manner using a formulation such that each tablet contains:

| Thaumatin-gelatin sweetening composition of Example 1 | 5 mg |
|---|---|
| Saccharin | 14 mg |
| Glucuronic acid | 38 mg |
| Sucrose | 54 mg |
| Gum arabic | 3 mg |
| Magnesium stearate | 1 mg |
| Total weight | 115 mg |

The sucrose helps to render the powder free-flowing for tableting and the gum arabic and magnesium stearate respectively help to bind and lubricate the tablets.

The tablets are each equivalent in tea and coffee to 4.4 g sucrose and give to tea and coffee a pleasant taste which is preferable to and superior to that obtained with conventional saccharin tablets.

In a variation of the above formulation, the 5 mg of thaumatin—gelatin composition of Example 1 is replaced by 12.5 mg of a 2:3 monellin—gelatin composition prepared by the procedure of Example 1 using monellin instead of thaumatin. The components and preparations are otherwise the same and give tablets with similar advantages properties.

In a further variation, the 14 mg saccharin is replaced by 30 mg aspartame and a similar product is obtained. The aspartame is preferably in the form of a gelatin-aspartame composition according to the invention. Alternatively, the sweetness may be added in the form of a thaumatin/aspartame/gelatin composition.

EXAMPLE 4

Readily dissolving dipeptide-gelatin low calorie sweetening composition

To 1.2 l distilled water was added 28 g fumaric acid. 120 g gelatin was dispersed in the solution by even, low speed mixing and simultaneous heating to 42° C.

To the resultant solution was added 80 g of aspartylphenylalanine methyl ester; slow mixing gave a homogeneous clear solution.

The resulting solution was dried to give a dried powder. There was no loss of sweetness when samples of the present product were dissolved in hot water at 80° to 97° C.

I claim:

1. A sweetening composition which comprises gelatin intimately mixed with a protein sweetener selected from the group consisting of monellin and thaumatin, the ratio by weight of gelatin to protein sweetener being 1:1 to less than 100:1.

2. A composition according to claim 1, in which the ratio of gelatin to protein sweetener is less than 20:1.

3. A composition according to claim 1, in which the ratio of gelatin to protein sweetener is from 1:1 to 5:1.

4. A composition according to claim 1, in which the gelatin is Type A gelatin.

5. A composition according to claim 4, in which the gelatin has a Bloom strength of greater than 200.

6. A composition according to claim 1, further containing at least one edible acid.

7. A composition according to claim 6, in which the edible acid is selected from the group consisting of citric, malic, fumaric and mucic acids.

8. A composition according to any one of claims 1 to 7, containing the protein sweetener in combination with at least one component selected from the group consisting of other sweeteners, taste modifiers and flavouring agents.

9. A composition according to claim 1, in a form selected from the group consisting of powders, tablets, granules, dragees, semi-solids and liquids.

10. A process for the preparation of a solid composition according to claim 1, in which an aqueous co-solution of the protein sweetener selected from the group consisting of monellin and thaumatin and the gelatin is formed and then dried.

11. A process according to claim 10, in which the pH of the solution is adjusted to be from 2.5 to 2.9 by addition of at least one edible acid.

12. A process according to claim 11, in which the edible acid is selected from the group consisting of citric, malic, fumaric and mucic acids.

13. A process according to claim 11, in which the gelatin is dissolved in potable water containing the appropriate amount of edible acid to give the required pH, and the protein sweetener is then added.

14. A process according to claim 13, in which the water is moderately heated to dissolve the gelatin and then cooled to below 40° C. before the protein sweetener is added.

15. A method of sweetening a substance by adding thereto a protein sweetener selected from the group consisting of monellin and thaumatin intimately mixed with gelatin, the weight ratio of gelatin to protein sweetener being 1:1 to less than 100:1.

16. A method according to claim 15, in which the ratio is 1:1 to 5:1 and in which the gelatin is Type A with a Bloom strength of greater than 200.

* * * * *